United States Patent
Sullivan

(10) Patent No.: US 11,820,486 B2
(45) Date of Patent: Nov. 21, 2023

(54) SEAT TRACK ASSEMBLY WITH ELONGATE CARBON-FIBER REINFORCED POLYMER FLANGE

(71) Applicant: The Boeing Company, Chicago, IL (US)

(72) Inventor: Kevin Lee Sullivan, Summerville, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/652,648

(22) Filed: Feb. 25, 2022

(65) Prior Publication Data
US 2023/0271693 A1 Aug. 31, 2023

(51) Int. Cl.
*B64C 1/20* (2006.01)

(52) U.S. Cl.
CPC ...................... *B64C 1/20* (2013.01)

(58) Field of Classification Search
CPC .......... B64C 1/20; B64C 1/18; B64D 11/0696
See application file for complete search history.

(56) References Cited

U.S. PATENT DOCUMENTS

| | | | | |
|---|---|---|---|---|
| 5,083,727 A | * | 1/1992 | Pompei | B64D 11/04 244/118.6 |
| 7,338,013 B2 | * | 3/2008 | Vetillard | B64C 1/18 244/118.1 |
| 8,336,820 B2 | * | 12/2012 | Osorio | B64C 1/18 52/650.1 |
| 8,740,151 B1 | * | 6/2014 | Rosman | B64C 1/065 244/119 |
| 9,663,231 B2 | | 5/2017 | Konez | |
| 10,556,691 B2 | | 2/2020 | Simpson | |
| 2005/0224648 A1 | * | 10/2005 | Grether | B64C 1/20 244/118.5 |
| 2005/0258676 A1 | * | 11/2005 | Mitchell | B60N 2/0224 297/216.13 |
| 2016/0130004 A1 | * | 5/2016 | Vichniakov | B64C 1/20 248/503.1 |
| 2021/0206467 A1 | * | 7/2021 | Sjostrom | B64C 1/18 |

FOREIGN PATENT DOCUMENTS

DE 102019135415 A1 * 6/2021

* cited by examiner

*Primary Examiner* — Brady W Frazier
*Assistant Examiner* — Shanna Danielle Glover
(74) *Attorney, Agent, or Firm* — Alleman Hall Creasman & Tuttle LLP

(57) ABSTRACT

A seat track assembly is disclosed. The seat track assembly includes an elongate titanium crown, an elongate carbon-fiber reinforced polymer (CFRP) flange, and an elongate CFRP base. The elongate titanium crown is configured to removably secure a plurality of seats to the seat track assembly. The elongate CFRP flange is configured to support the elongate titanium crown. The elongate CFRP base has a top, two sidewalls extending vertically from opposing sides of the top, and two bottom flanges each extending laterally outward from a corresponding sidewall of the two sidewalls. A fastener is insertable through aligned holes defined by the elongate titanium crown, the elongate CFRP flange, and the elongate CFRP base to mechanically fasten the elongate titanium crown, the elongate CFRP flange, and the elongate CFRP base to each other.

20 Claims, 6 Drawing Sheets

SEAT TRACK ASSEMBLY WITH ELONGATE CARBON-FIBER REINFORCED POLYMER FLANGE

FIELD

The disclosure relates generally to a seat track assembly, and more specifically to a seat track assembly that is separable into a collection of sub-components that are mechanically fastened together to form the seat track assembly.

BACKGROUND

Monolithic seat tracks in passenger floor structures of aircraft or other vehicles are prone to corrosion and physical degradation over time. Physical degradation usually occurs in a crown of the seat track, where seats and other monuments attach to the seat track. In some cases, physical degradation can occur in a flange of the seat track that supports floor panels that reside in between neighboring seat tracks. In one example, a method of repairing a monolithic seat track that has physically degraded requires the entire seat track to be removed and replaced with a new seat track even though only a portion of the seat track is physically degraded. Such a repair process destroys the previous alignment to adjacent seat tracks for Waterline (WL), Station (STA), and Buttline (BL) axes of the aircraft. Collectively re-aligning a plurality of seat tracks in all three axes upon installing a new seat track as part of a repair process is exceedingly time consuming.

SUMMARY

A seat track assembly is disclosed. The seat track assembly includes an elongate titanium crown, an elongate carbon-fiber reinforced polymer (CFRP) flange, and an elongate CFRP base. The elongate titanium crown is configured to removably secure a plurality of seats to the seat track assembly. The elongate CFRP flange is configured to support the elongate titanium crown. The elongate CFRP base has a top configured to support the elongate CFRP flange, two sidewalls extending vertically from opposing sides of the top, and two bottom flanges each extending laterally outward from a corresponding sidewall of the two sidewalls. A fastener is insertable through aligned holes defined by the elongate titanium crown, the elongate CFRP flange, and the elongate CFRP base to mechanically fasten the elongate titanium crown, the elongate CFRP flange, and the elongate CFRP base to each other. The fastener is removeable from the aligned holes to allow for the elongate titanium crown, the elongate CFRP flange, and the elongate CFRP base to be mechanically separated from each other.

The features and functions that have been discussed can be achieved independently in various embodiments or may be combined in yet other embodiments, further details of which can be seen with reference to the following description and drawings.

DETAILED DESCRIPTION

The present description is directed to a seat track assembly having improved corrosion resistance, while also being easier to repair or replace, and lighter in weight and lower in cost relative to other monolithic seat track assemblies. The herein-described seat track assembly reduces the time needed to effect repairs by separating the seat track structure into a collection of sub-components including an elongate titanium crown, an elongate carbon-fiber reinforced polymer (CFRP) flange, and an elongate CFRP base. The elongate titanium crown is configured to removably secure a plurality of seats to the seat track assembly. The elongate CFRP flange is configured to support the titanium crown. The elongate CFRP flange is further configured to support a floor panel positioned between neighboring seat track assemblies.

A fastener is insertable through aligned holes defined by the elongate titanium crown, the elongate CFRP flange, and the elongate CFRP base to mechanically fasten the elongate titanium crown, the elongate CFRP flange, and the elongate CFRP base to each other. The fastener is removeable from the aligned holes to allow for the elongate titanium crown, the elongate CFRP flange, and the elongate CFRP base to be mechanically separated from each other.

By forming the elongate crown from titanium, the elongate crown has improved degradation and corrosion characteristics relative to a crown formed from materials such as steel or aluminum. Further, by forming the elongate flange and the elongate base from CFRP, the elongate flange and the elongate base have improved degradation and corrosion characteristics relative to corresponding sub-components formed from aluminum or other materials. Also, by forming these sub-components from CFRP, the sub-components are less expensive to produce relative to corresponding sub-components formed from titanium. The elongate crown is formed from titanium while the elongate flange and the elongate base need not be formed from titanium and instead are formed from CFRP, because the elongate crown is exposed to more frequent sources of degradation. For example, passenger and crew exposure, and/or the process of installing and uninstalling seats into a seat track, can be sources of degradation that are resisted by the superior material strength properties of titanium. Since the other sub-components are less exposed to such sources of degradation, CFRP can provide suitably high degradation and corrosion characteristics while being less expensive and lighter weight than titanium. Moreover, using CFRP instead of titanium allows for fasteners to be installed in the seat track assembly without requiring fay sealing and/or wetting lubricant during install.

Figure 1:
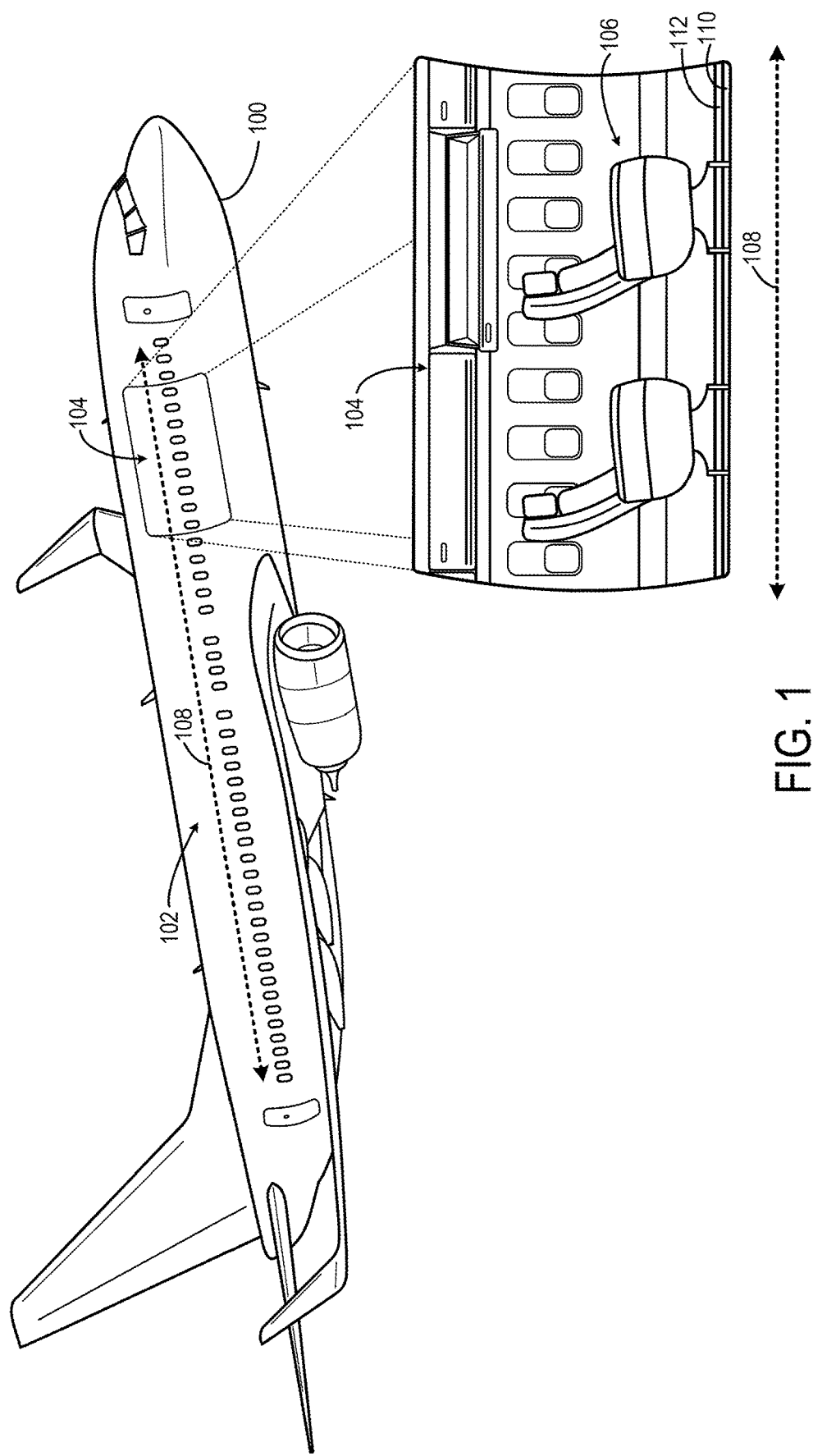
FIG. 1 shows an example embodiment of an aircraft in which seats are installed onto seat track assemblies.

FIG. 1 shows an illustrative aircraft 100 including a fuselage 102. The fuselage 102 includes an interior cabin section 104, illustrated with increased detail in the call out. The interior cabin section 104 includes a plurality of passenger seats 106 arranged in rows oriented perpendicular to a longitudinal axis 108 of the fuselage 102. Each row of passenger seats 106 is mechanically fastened to two or more seat track assemblies 110, which are typically oriented coaxially with the longitudinal axis 108 of the fuselage 102. The seat track assemblies 110 provide a structural frame that anchors the passenger seats 106 to the fuselage 102. An aircraft floor panel 112 is installed in between a pair of seat track assemblies 110. The aircraft floor panel 112 provides a structural floor to support passengers, luggage, and other equipment within the interior cabin section 104.

The aircraft 100 is provided as a non-limiting example of a vehicle in which the seat track assemblies 110 may be used. The seat track assemblies 110 may be used in any suitable type of vehicle to provide improved corrosion resistance, while also being easier to repair or replace, and lighter in weight and lower in cost relative to other monolithic seat assemblies.

Figure 2:
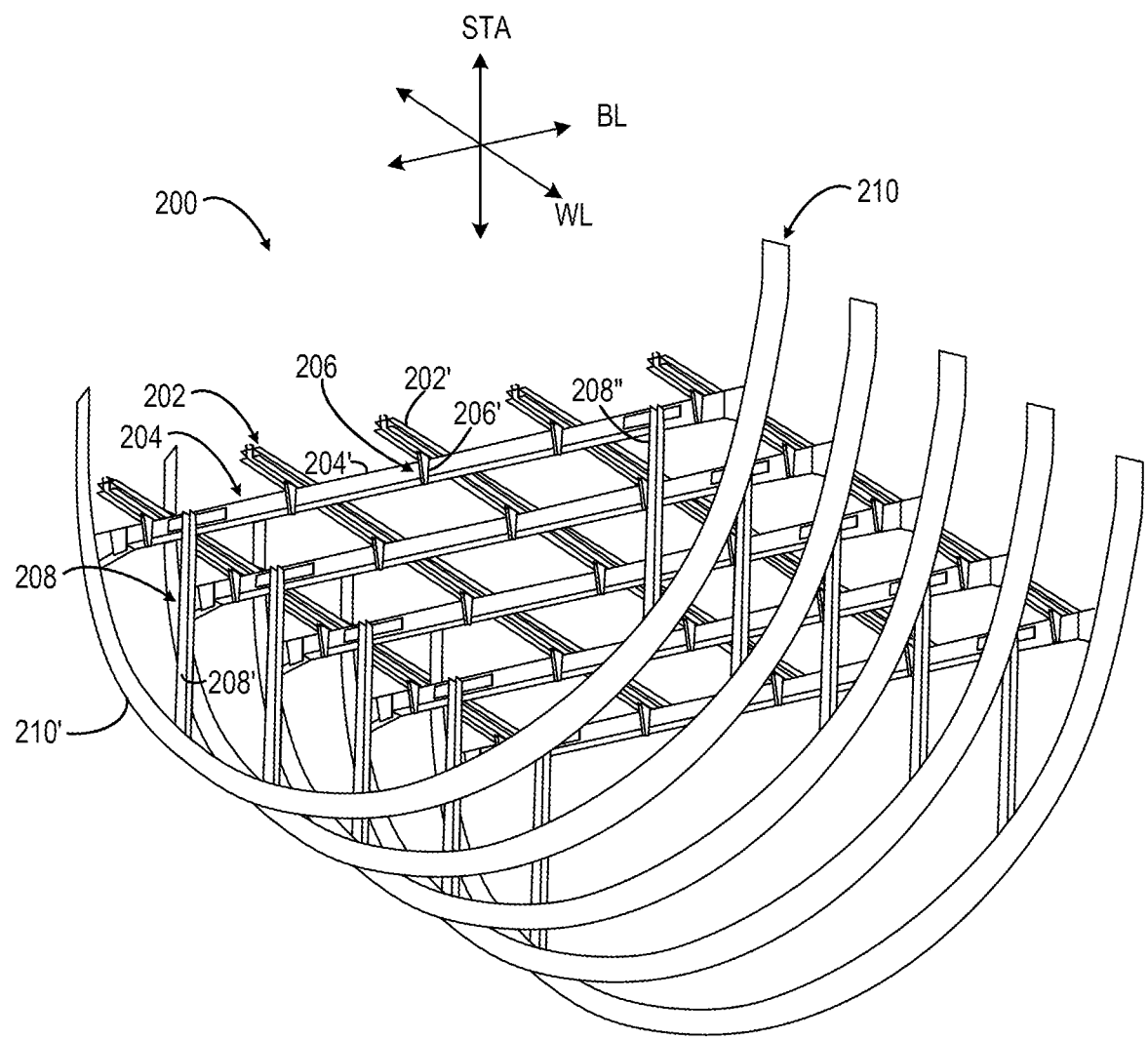
FIG. 2 shows an example embodiment of a portion of a floor support structure of an aircraft including a plurality of seat track assemblies. assembly.

FIG. 2 shows an example embodiment of a portion of a floor support structure 200 of an aircraft including a plurality of seat track assemblies 202 supported by a plurality of floor support beams 204. The seat track assemblies 202 are mounted on top of the floor support beams 204 via a plurality of shear clips 206. A plurality of floor stanchions 208 mechanically couple the plurality of floor support beams 204 to a plurality of fuselage support frames 210. In particular, a representative seat track assembly 202' is mounted on top of a representative floor support beam 204'. Note that the use of (') and (") indicate individual representative instances of a plurality of a particular component. For example, representative seat track assembly 202' is representative of the plurality of seat track assemblies 202 included in the floor support structure 200. A representative shear clip 206' mechanically fastens the representative seat track assembly 202' to the representative floor support beam 204'. A pair of representative floor stanchions 208' and 208" are mechanically coupled to opposing ends of the representative floor support beam 204'. The pair of representative floor stanchions 208' and 208" are mechanically coupled to a representative fuselage support frame 210'.

Each of the plurality of seat track assemblies 202 may be arranged in the same manner as the representative seat track assembly 202' to form the floor support structure 200. The plurality of seat track assemblies 202 are aligned relative to each other in terms of Waterline (WL), Station (STA), and Buttline (BL) axes of the aircraft.

The representative seat track assembly 202' includes a collection of sub-components that can be mechanically separated from each other in case the need arises to replace or repair a particular sub-component. For example, an elongate titanium crown (e.g., the elongate titanium crown 302 shown in FIGS. 3-4) is configured to be removable from the representative seat track assembly 202' without destroying the overall alignment of the representative seat track assembly 202' in any of the Waterline, Station, and Buttline axes. In particular, the other sub-components of the representative seat track assembly 202' can remain in place in the floor support structure 200 even when the elongate titanium crown is removed.

Figure 3:
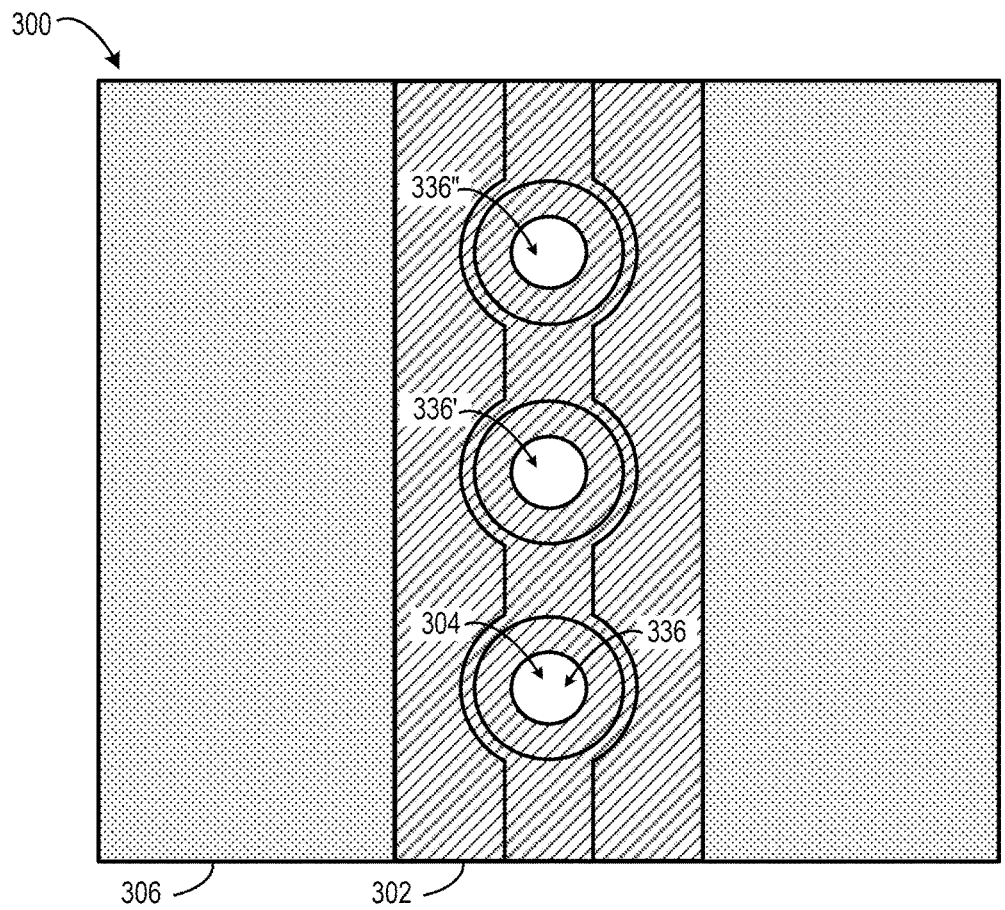
FIG. 3-4 show an example embodiment of a portion of a seat track
Figure 4:
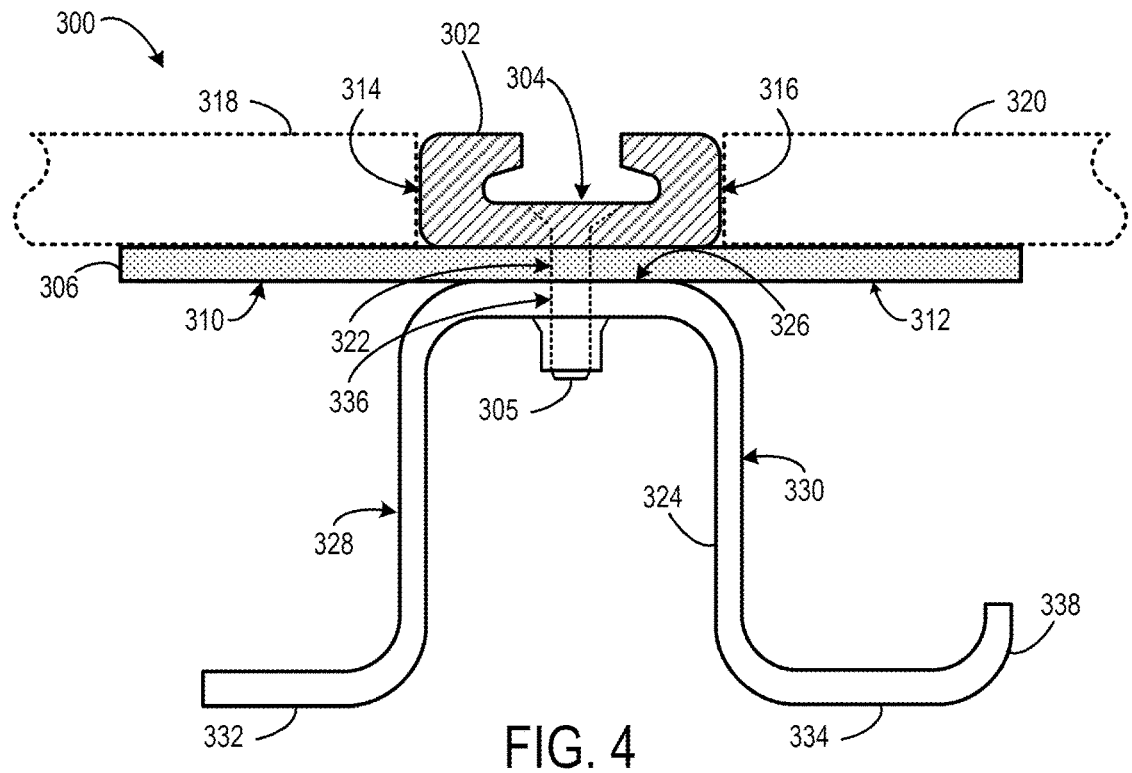

FIGS. 3-4 show an example embodiment of a portion of a seat track assembly 300. For example, the seat track assembly 300 may be representative of any of the plurality of seat track assemblies 202 shown in FIG. 2. FIG. 3 shows a top view of a partial length of the seat track assembly 300. FIG. 4 shows a cross-section view of the seat track assembly 300.

The seat track assembly 300 includes an elongate titanium crown 302 configured to removably secure a plurality of seats (not shown) to the seat track assembly 300. The elongate titanium crown 302 forms a plurality of holes 304 that are configured to receive a plurality of fasteners, such as a fastener 305. In some cases, a fastener may be inserted into one of the plurality of holes 304 to mechanically fasten the different sub-components of the seat track assembly to each other. In some cases, a fastener may be inserted into one of the plurality of holes 304 to mechanically fasten a seat to the seat track assembly 300. The plurality of holes 304 formed in the elongate titanium crown 302 allows for secure attachment of a seat, with flexibility to move a seat quickly and simply by removing the corresponding fasteners and aligning the seat with a different set of holes in the elongate titanium crown 302.

The material strength characteristics of the elongate titanium crown 302 are suitable to reduce or prevent degradation over time due to absorbing various forces applied by seats or other components fastened to the elongate titanium crown 302 during operation. The material strength characteristics of titanium are greater than other more corrodible materials typically used to form a crown, such as aluminum. Further, titanium has material characteristics that are suitable to reduce or prevent corrosion over long-term operation. Additionally, titanium has a higher strength per weight ratio relative to other materials having similar material strength characteristics, which contributes to an overall weight reduction of an aircraft in which the seat track assembly 300 is installed.

The seat track assembly 300 includes an elongate carbon-fiber reinforced polymer (CFRP) flange 306 that is configured to support the elongate titanium crown 302. The elongate CFRP flange 306 has a width that is greater than a width of the elongate titanium crown 302. The elongate CFRP flange 306 includes projections 310 and 312 that extend outward laterally beyond sides 314 and 316 of the elongate titanium crown 302. The projections 310 and 312 are configured to support floor panels 318 and 320 that span between corresponding projections of neighboring seat track assemblies (not shown). The projections 310 and 312 may have a width that is suitable to support the floor panels 318 and 320.

In some embodiments, the elongate CFRP flange 306 is flat—that is, the flange has a planar upper surface—to support the floor panels 318 and 320. In other embodiments, the elongate CFRP flange 306, or a portion thereof, has anon-flat surface (e.g., concave or convex cross-section) that supports the floor panels 318 and 320. In some embodiments, the elongate CFRP flange 306 has a surface that varies along the length of the seat track assembly 300. For example, the elongate CFRP flange 306 may include a sequence of features (e.g., posts, holes, scallops) that interfaces with a cooperating sequence of features of the floor panels 318 and 320 that allow for the floor panels 318 and 320 to interlock between neighboring seat track assemblies. In some embodiments, the elongate titanium crown 302 may include a sequence of features that interface with a cooperating sequence of features of the floor panels 318 and 320.

Somewhat similarly, although the portion of the elongate CFRP flange that supports the elongate titanium crown is also shown in FIG. 4 to be flat, some embodiments may include a non-flat portion (e.g., a concave or convex cross-section) and/or may include surface features (e.g. nubs, grooves, detents, and so forth), such as to mate or align with a correspondingly shaped surface or complementary surface features provided on the elongate titanium crown, for example to facilitate alignment of the components prior to being fastened together.

The elongate CFRP flange 306 forms a plurality of holes 322 that are configured to receive a plurality of fasteners, such as the fastener 305. The plurality of holes 322 in the elongate CFRP flange 306 are configured to align with the plurality of holes 304 formed in the elongate titanium crown 302. In some embodiments, the plurality of holes 304 formed in the elongate titanium crown 302 and the plurality of holes 322 formed in the elongate CFRP flange 306 may have a same diameter.

The seat track assembly 300 includes an elongate CFRP base 324 having a top 326 configured to support the elongate CFRP flange 306. The elongate CFRP base 324 further includes two sidewalls 328 and 330 extending vertically from opposing sides of the top 326, and two bottom flanges 332 and 334 each extending laterally outward from a corresponding sidewall of the two sidewalls 328 and 330. As used here, vertically can mean substantially vertically (e.g., within +/−10 degrees) such that sidewalls 328 and 330 are not necessarily parallel; and horizontally can mean substantially horizontally (e.g., within +/−22.5 degrees). In general, any shape that provides suitable structural properties is within the scope of this disclosure.

Also, although the surfaces of the elongate CFRP flange and that of the elongate CFRP base that contact each other when the components are fastened together are shown in FIG. 4 to be flat, as noted above, these surfaces or portions thereof may be non-flat (e.g., concave or convex), and/or include corresponding surface features, to facilitate alignment of the components prior to being fastened together.

In some embodiments, one or more of the bottom flanges 332 and 334 of the elongate CFRP base 324 include stiffening return flanges 338 that project upward from outer edges of the bottom flanges. In the illustrated embodiment, the bottom flange 334 includes a stiffening return flange 338. The stiffening return flanges 338 may be included in the elongate CFRP base 324 in scenarios where the elongate CFRP base 324 has greater operational weight requirements. For example, stiffening return flanges 338 may be included in the elongate CFRP base 324 when the seat track assembly 300 is used in a floor support structure of a cargo aircraft and the seat track assembly 300 has to support the weight of cargo that may be greater than the weight of passengers.

The elongate CFRP base 324 forms a plurality of holes 336 that are configured to receive a plurality of fasteners, such as the fastener 305. The plurality of holes 336 formed in the elongate CFRP base 324 are configured to align with the plurality of holes 304 formed in the elongate titanium crown 302 and the plurality of holes 322 formed in the elongate CFRP flange 306. In some embodiments, the plurality of holes 304 formed in the elongate titanium crown 302, the plurality of holes 322 formed in the elongate CFRP flange 306, and the plurality of holes 336 formed in the elongate CFRP base 324 may have a same diameter.

In one example of an embodiment in which one or more of the components of the assembly is shaped and/or includes surface features to facilitate alignment in assembly, at least some of the holes may be configured to provide such alignment. In such an example, at least some of the plurality of holes 322 in the elongate CFRP flange 306, and/or at least some of the plurality of holes 336 in the elongate CFRP base 324 are configured to partially protrude from the surface of the component, such as to partially nest within a corresponding hole in another component.

The fastener 305 is insertable through aligned holes 304, 322, 336 defined by the elongate titanium crown 302, the elongate CFRP flange 306, and the elongate CFRP base 324 to mechanically fasten the elongate titanium crown 302, the elongate CFRP flange 306, and the elongate CFRP base 324 to each other. Further, the fastener 305 is removeable from the aligned holes 304, 322, 336 to allow for the elongate titanium crown 302, the elongate CFRP flange 306, and the elongate CFRP base 324 to be mechanically separated from each other.

The aligned holes 304, 322, 336 defined by the elongate titanium crown 302, the elongate CFRP flange 306, and the elongate CFRP base 324 form a first set of aligned holes 336 that correspond to the fastener 305. Further, the elongate titanium crown 302, the elongate CFRP flange 306, and the elongate CFRP base 324 form a plurality of sets of aligned holes 336, 336', 336", . . . The plurality of sets of aligned holes 336, 336', 336", . . . are longitudinally spaced apart along the seat track assembly 300.

A plurality of fasteners (not shown) are insertable through the plurality of sets of aligned holes 336, 336', 336", . . . to mechanically fasten the elongate titanium crown 302, the elongate CFRP flange 306, and the elongate CFRP base 324 to each other. The plurality of fasteners are removeable from the plurality of sets of aligned holes 336, 336', 336", . . . to allow for the elongate titanium crown 302, the elongate CFRP flange 306, and the elongate CFRP base 324 to be mechanically separated from each other.

By allowing the individual sub-components of the seat track assembly 300 to be separable from each other, the individual sub-components of the seat track assembly 300 can be removed and/or replaced while preserving a prior alignment (that is, without requiring re-alignment) of the seat track assembly 300 within the floor support structure of the aircraft with respect to the Waterline (WL), Station (STA), and Buttline (BL) axes of the aircraft. In this way, the seat track assembly 300 facilitates quick and easy maintenance and/or repairs relative to a monolithic seat track assembly that must be arduously realigned when being replaced and/or repaired.

The elongate CFRP flange 306 and the elongate CFRP base 324 are formed from CFRP material, which has a higher strength-to-weight ratio and stiffness (rigidity) relative to steel, aluminum, and other materials typically used in a monolithic seat track assembly. The CFRP material may include a binding polymer that provides suitable material strength and stiffness characteristics to support the floor panels 318 and 320 as well as additional weight requirements (e.g., seats, passengers, cargo) of the aircraft. In some examples, the CFRP flange 306 may be formed using a binding polymer that includes a thermoset resin, such as epoxy. In some examples, other thermoset or thermoplastic polymers may be used. Additionally, the CFRP material can be easily curved/folded to form the curved corners of the elongate CFRP base 324. Forming such curved corners for a base made from metal may be substantially more complex and time consuming relative to CFRP material.

Figure 5:
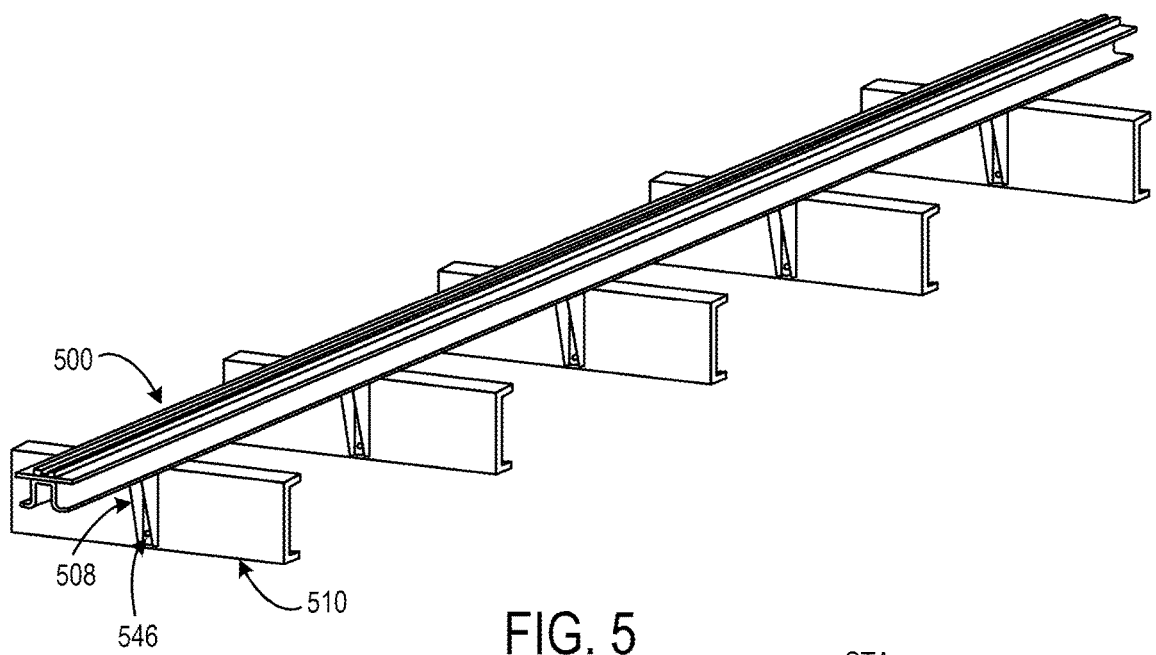
FIGS. 5-6 show an example embodiment of a portion of a seat track assembly that is configured to pass over the tops of a plurality of floor support beams.
Figure 6:
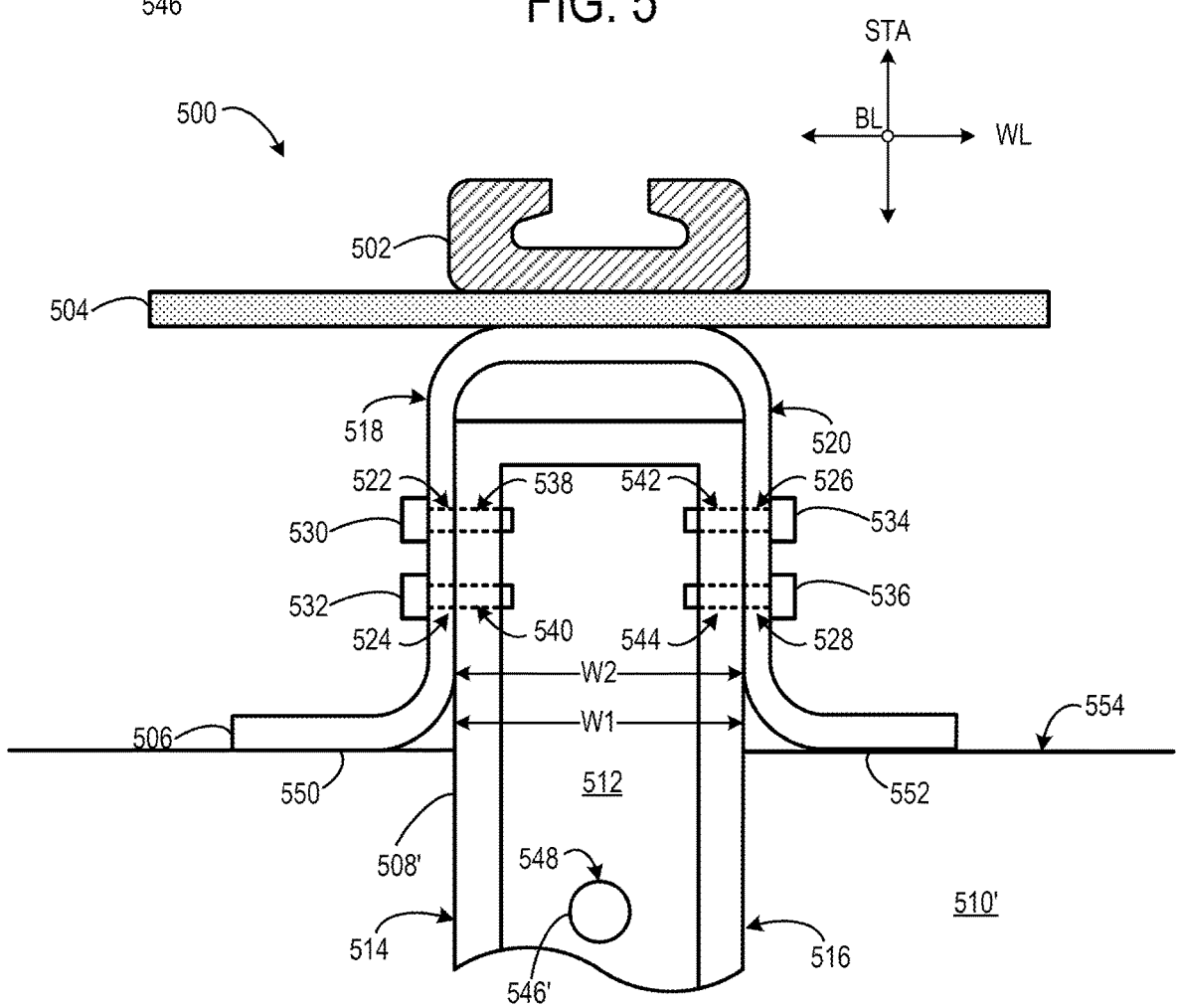

A seat track assembly can be configured to mount to a plurality of floor support beams differently in different embodiments. In some embodiments, a seat track assembly can be configured to mount on top of a plurality of floor support beams such that the seat track assembly passes above the plurality of floor support beams. FIGS. 5-6 show an example embodiment of a seat track assembly 500 that is configured to mount on top of a plurality of floor support beams 510. For example, the seat track assembly 500 can be representative of the seat track assembly 300 shown in FIGS. 3-4. The seat track assembly 500 comprises an elongate titanium crown 502, an elongate CFRP flange 504, and an elongate CFRP base 506. The seat track assembly 500 further comprises a plurality of shear clips 508 corresponding to a plurality of floor support beams 510. Each of the plurality of shear clips 508 is configured to mechanically fasten the elongate CFRP base 506 of the seat track assembly 500 to a corresponding floor support beam 510.

In some embodiments, the plurality of shear clips 508 comprise titanium. Shear clips comprising titanium reduces the likelihood of the shear clips corroding relative to shear clips comprising materials such as steel or even aluminum. Further, titanium sheer clips eliminate the need for fay seal and wet installation of fasteners. In other embodiments, the plurality of shear clips 508 comprise CFRP. Shear clips comprising CFRP provide high strength-to-weight characteristics while being lower in cost and complexity to manufacture than titanium. In still other embodiments, the plurality of shear clips 508 may comprise another material having suitably high strength-to-weight and/or corrosion-resistive characteristics.

A representative shear clip 508' of the plurality of shear clips 508 comprises a backplate 512 and two sidewalls 514, 516. An exterior width (W1) of the representative shear clip 508' is slightly less than an interior width (W2) between sidewalls 518, 520 of the elongate CFRP base 506, so that the representative shear clip 508' is able to fit within the elongate CFRP base 506. Each of the sidewalls 518, 520 of elongate CFRP base 506 form holes 522, 524, 526, 528 that are configured to receive base fasteners 530, 532, 534, 536. Correspondingly, each of the sidewalls 514, 516 of the representative shear clip 508' form holes 538, 540, 542, 544 that are configured to receive the base fasteners 530, 532, 534, 536. The holes 538, 540, 542, 544 formed in the representative shear clip 508' are configured to align with the holes 522, 524, 526, 528 formed in the elongate CFRP base 506 when the representative shear clip 508' is fit within the elongate CFRP base 506. In the illustrated embodiment, two base fasteners are used to mechanically fasten each sidewall of the representative shear clip 508' to the elongate CFRP base 506 to prevent the representative shear clip 508' from rotating relative to the elongate CFRP base 506. A different number of base fasteners can be used.

The representative shear clip 508' is configured to mechanically fasten to a representative floor support beam 510' via a plurality of beam fasteners (e.g., representative beam fastener 546' shown in FIG. 6). In particular, the backplate 512 forms a plurality of holes (e.g., representative hole 548' shown in FIG. 6) each configured to receive a corresponding beam fastener (e.g., representative beam fastener 546'). The plurality of beam fasteners 546 are configured to mechanically fasten the representative shear clip 508' to the representative floor support beam 510'. The representative shear clip 508' is mechanically fastened to the representative floor support beam 510' via two or more beam fasteners to prevent the representative shear clip 508' from rotating relative to the representative floor support beam 510'.

In the illustrated embodiment, the plurality of beam fasteners 546 are oriented perpendicular to the plurality of base fasteners 530, 532, 534, 536 to maintain alignment of the seat track assembly 500 in all three axes (i.e., STA, BL, WL axes) when the seat track assembly 500 is mechanically fastened to the plurality of floor support beams 510.

In the illustrated embodiment, the representative shear clip 508' is configured to mechanically fasten the elongate CFRP base 506 to the representative floor support beam 510', such that two bottom flanges 550, 552 of the elongate CFRP base 506 are positioned above the representative floor support beam 510'. In some embodiments, the bottom flanges 550, 552 can rest on a top 554 of the representative floor support beam 510'. In other embodiments, there may be a gap between the bottom flanges 550, 552 and the top 554 of the representative floor support beam 510'. Such clearance may depend on the design requirements of the floor support structure of the aircraft. The illustrated embodiment of the seat track assembly that is positioned entirely over the tops of the plurality of floor support beams facilitates straightforward alignment since each of the plurality of floor support beams is continuous. However, such a seat track assembly has an increased overall height relative to a seat track assembly that at least partially fits between adjacent floor support beams.

Figure 7:
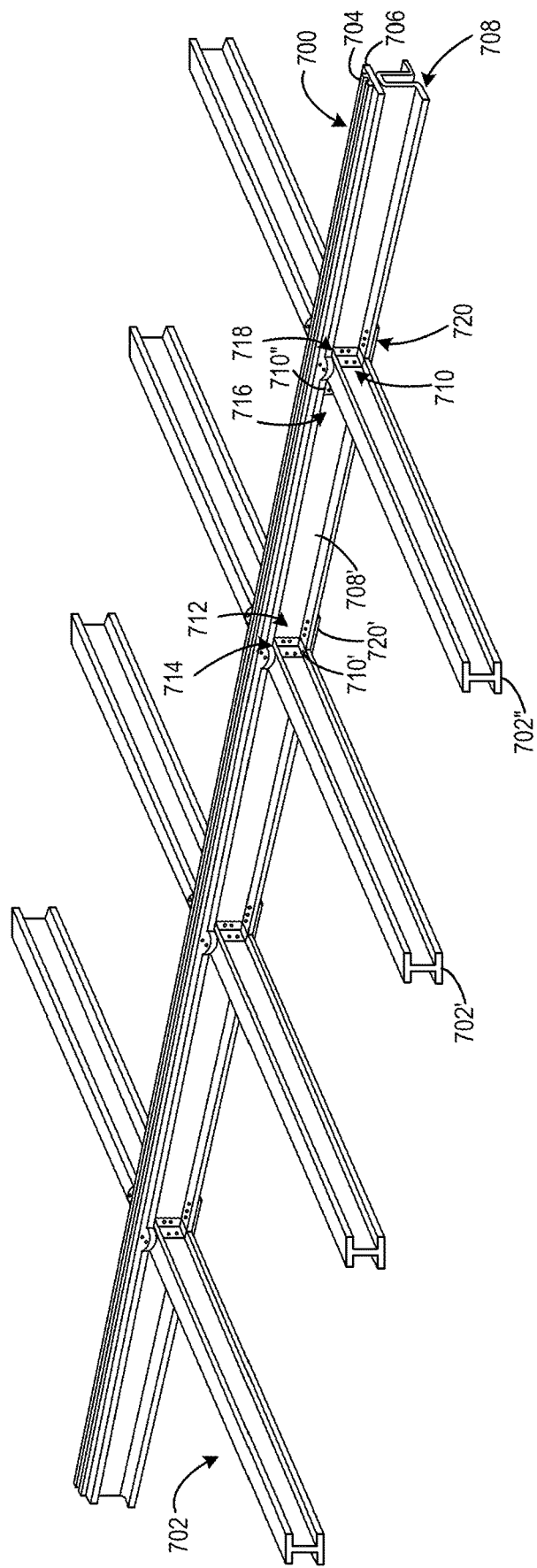
FIG. 7 shows an example embodiment of a portion of a seat track assembly that is configured to fit between a plurality of floor support beams.
Figure 8:
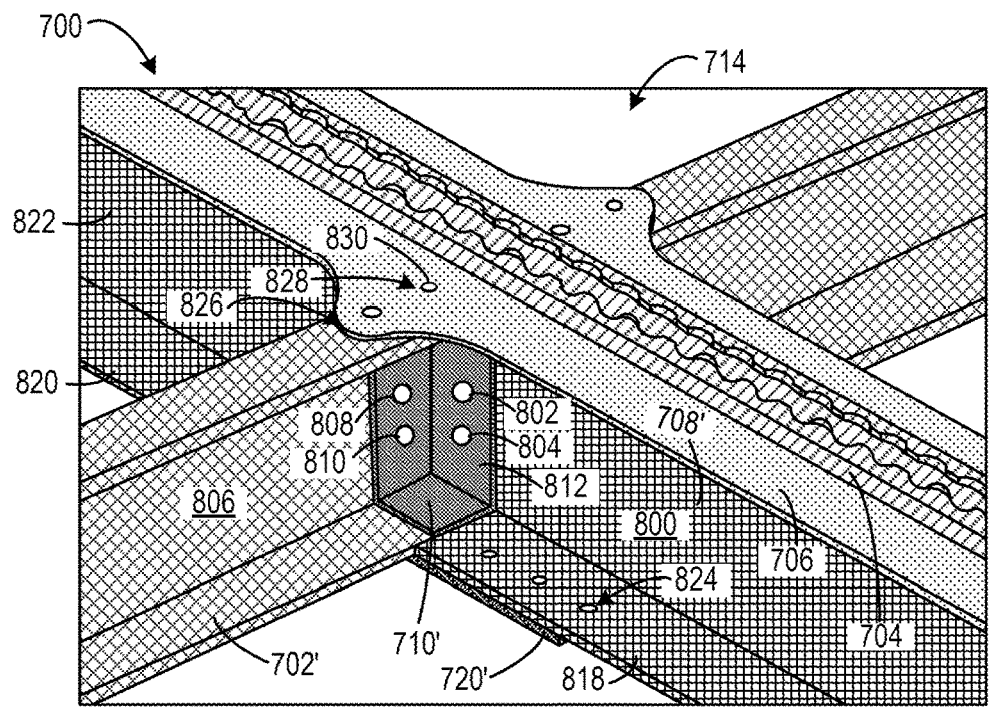
FIG. 8 shows a top view of an intersection of the seat track assembly shown in FIG. 7
Figure 9:
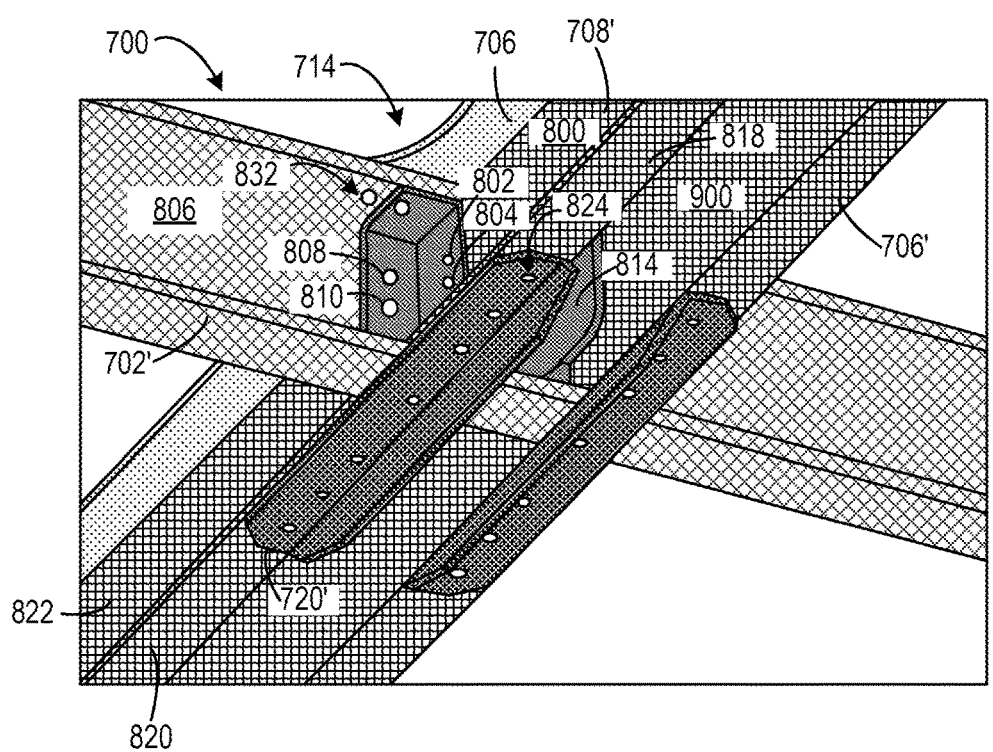
FIG. 9 shows a bottom view of an intersection of the seat track assembly shown in FIG. 7.

In some embodiments, a seat track assembly can be configured to at least partially fit between adjacent floor support beams. FIGS. 7-9 show an example embodiment of a seat track assembly 700 that is configured to at least partially fit between adjacent floor support beams of a plurality of floor support beams 702. For example, the seat track assembly 700 can be representative of the seat track assembly 300 shown in FIGS. 3-4. The seat track assembly 700 comprises an elongate titanium crown 704, an elongate CFRP flange 706, and a plurality of discrete elongate CFRP base sections 708.

In the illustrated embodiment, the elongate titanium crown 704 and the elongate CFRP flange 706 are both configured to span across tops of the plurality of floor support beams 702. Each of the plurality of discrete elongate CFRP base sections 708 is configured to fit between adjacent floor support beams of the plurality of floor support beams 702. The plurality of discrete elongate CFRP base sections 708 is configured to fasten to the plurality of floor support beams 702 via a plurality of shear clips 710. For example, a representative discrete elongate CFRP base section 708' is configured to fit between representative adjacent floor support beams 702' and 702". A first end 712 of the representative discrete elongate CFRP base section 708' is fastened to the first representative floor support beam 702' via a first shear clip 710' at a first intersection 714 and a second end 716 of the representative discrete elongate CFRP base section 708' is fastened to the second representative floor support beam 702" via a second shear clip 710" at a second intersection 718.

FIG. 8 shows a top view of the intersection 714 of the seat track assembly 700 shown in FIG. 7, and FIG. 9 shows a bottom view of the intersection 714 of the seat track assembly 700 shown in FIG. 7. In the illustrated embodiment, the first shear clip 710' mechanically fastens to a corresponding sidewall 800 of the representative discrete elongate CFRP base section 708' via base fasteners 802 and 804. Further, the first shear clip 710' mechanically fastens to a corresponding sidewall 806 of the representative floor support beam 702' via support fasteners 808 and 810. Any suitable type of fasteners can be used to mechanically fasten the first shear clip 710' to the corresponding sidewall 800 of the representative discrete elongate CFRP base section 708' and the corresponding sidewall 806 of the representative floor support beam 702'. For example, the fasteners may be screws, bolts, rivets, or another type of fastener.

In the illustrated embodiment, the first shear clip 710' is configured to maintain the representative discrete elongate CFRP base section 708' in alignment with the representative floor support beam 702' by bracketing the representative discrete elongate CFRP base section 708'. In particular, the first shear clip 710' comprises exterior bracket walls (e.g., exterior bracket wall 812) that fasten to corresponding exterior sidewalls of the representative discrete elongate CFRP base section 708' (e.g., exterior sidewall 800). The first shear clip 710' further comprises interior bracket walls (e.g., interior bracket wall 814 shown in FIG. 9) that fasten to interior sidewalls (e.g., interior sidewall 900 shown in FIG. 9) of the representative discrete elongate CFRP base section 708'. The shear clip 710' is provided as a non-limiting example. The shear clip may take any suitable form to mechanically fasten the representative discrete elongate CFRP base section 708' to the representative floor support beam 702'.

In some embodiments, the seat track assembly 700 comprises a plurality of splice fittings 720. Each splice fitting 720 is configured to mechanically fasten two adjacent discrete elongate CFRP base sections to each other as well as to an intervening floor support section. As shown in FIGS. 8-9, a representative splice fitting 720' is mechanically fastened to a bottom flange 818 of the representative discrete elongate CFRP base section 708', a bottom flange 820 of an adjacent discrete elongate CFRP base section 822, and the representative floor support beam 702' via a plurality of base flange fasteners 824. The plurality of splice fittings 720 may comprise any suitable material. In some embodiments, the plurality of splice fittings 720 comprise CFRP. In other embodiments, the plurality of splice fittings 720 comprise titanium. The plurality of splice fittings may be used to increase the overall rigidity of the seat track assembly 700, since the elongate CFRP base is divided into discrete sections in this embodiment.

In some embodiments, the elongate CFRP flange 706 is configured to mechanically fasten to each of the plurality of floor support beams 702 via a plurality of flange fasteners. In particular, the elongate CFRP flange 706 comprises a plurality of protrusions that extend laterally over the tops of the plurality of floor support beams 702. As shown in FIGS. 8-9, the elongate CFRP flange 706 comprises a representative protrusion 826 that forms holes 828 configured to receive flange fasteners 830. The representative floor support beam 702' forms corresponding holes 832 configured to align with the holes 828 formed in the representative protrusion 826 of the elongate CFRP flange 706. The flange fasteners 830 are insertable through the holes 828 and 832 to mechanically fasten the elongate CFRP flange 706 to the representative floor support beam 702'.

In the illustrated embodiment, the elongate titanium crown 704 and the elongate CFRP flange 706 are continuous, and the elongate CFRP base is segmented into a plurality of discrete sections 708. Each discrete CFRP base section 708 fits between adjacent floor support beams 702 spanned by the elongate titanium crown 704 and the elongate CFRP flange 706. The elongate CFRP flange 706 rests directly on the tops of the plurality of floor support beams 702 and is mechanically fastened to the plurality of floor support beams to provide suitable alignment strength. Each CFRP base section 708 mechanically fastened to adjacent floor support beams 702 via shear clips 710 to maintain moment continuity. In this embodiment, the elongate titanium crown 704 and the elongate CFRP flange 706 are lowered down relative to the position of corresponding sub-components of the seat track assembly 500 shown in FIG. 5. Such an arrangement allows the seat track assembly 700 to be recessed mostly between the floor support beams 702 to lower the overall height of the floor support structure of the aircraft. Such a height reduction can allow for an overall height reduction of the fuselage cross-section for drag reduction and improved aircraft flight performance and/or accommodate a taller cabin.

The herein-described seat track assembly comprises materials (i.e., titanium and CFRP) that reduce or eliminate the problem of corrosion. Further, such materials do not require fay surface sealant or corrosion inhibiting compound for installation. The CFRP components are shaped in such a manner that they can be produced using a variety of resin/fiber systems, including thermoset and thermoplastic materials as desired. Furthermore, the seat track assembly is separable into sub-components in a manner that allows for the elongate titanium crown and the elongate CFRP flange to be removeable for repair or replacement without causing the seat track assembly to fall out of alignment with a floor support structure in which the seat track assembly is aligned. In particular, the elongate CFRP base remains attached to the floor support beams and in WL, BL, and STA alignments. Because this joint remains intact during crown and flange removal, the aligned holes in the crown, flange, and base allows the crown and flange to be re-aligned in the WL, BL, and STA alignments without the need for tooling when those sub-components are re-installed in seat track assembly. In this way, the original factory alignment can be maintained for the life of the aircraft. Although the seat track assembly is described in the context of being used in an aircraft, the seat track assembly can be used in any suitable vehicle to provide the features and benefits described above.

In an example, a seat track assembly, comprises an elongate titanium crown configured to removably secure a plurality of seats to the seat track assembly, an elongate carbon-fiber reinforced polymer (CFRP) flange configured to support the elongate titanium crown, and an elongate CFRP base having a top configured to support the elongate CFRP flange, two sidewalls extending vertically from opposing sides of the top, and two bottom flanges each extending laterally outward from a corresponding sidewall of the two sidewalls, wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other. In this example and/or other examples, the elongate CFRP flange may include projections that extend outward laterally beyond sides of the elongate titanium crown, and the projections may be configured to support floor panels that span between corresponding projections of neighboring seat track assemblies. In this example and/or other examples, the bottom flanges of the elongate CFRP base may include stiffening return flanges that project upward from outer edges of the bottom flanges. In this example and/or other examples, the seat track assembly may further comprise a plurality of shear clips corresponding to a plurality of floor support beams, each of the plurality of shear clips being configured to mechanically fasten the elongate CFRP base to a corresponding floor support beam. In this example and/or other examples, the plurality of shear clips may be at least one of titanium or CFRP. In this example and/or other examples, the seat track assembly further comprises a plurality of floor stanchions configured to mechanically couple the plurality of floor support beams to a fuselage structure. In this example and/or other examples, the elongate CFRP base may be configured to span the plurality of floor support beams, and each of the plurality of shear clips may be configured to mechanically fasten the elongate CFRP base to the corresponding floor support beam such that the two bottom flanges of the elongate CFRP base are positioned above the plurality of floor support beams. In this example and/or other examples, each of the plurality of shear clips may be configured to fit between the two sidewalls of the elongate CFRP base, and each of the plurality of shear clips may be configured to mechanically fasten to each of the two sidewalls via a plurality of base fasteners. In this example and/or other examples, each of the plurality of shear clips may be configured to mechanically fasten to the corresponding floor support beam via a plurality of beam fasteners, and the plurality of base fasteners may be oriented perpendicular to the plurality of beam fasteners in the seat track assembly. In this example and/or other examples, the elongate CFRP base may be configured to fit between a pair of adjacent floor support beams of the plurality of floor support beams, and each of the plurality of shear clips may mechanically fasten to a corresponding sidewall of the elongate CFRP base and a corresponding sidewall of an adjacent floor support beam. In this example and/or other examples, the elongate titanium crown and the elongate CFRP flange may be both configured to span across tops of the plurality of floor support beams. In this example and/or other examples, the elongate CFRP flange may be mechanically fastened to the pair of adjacent floor support beams via a plurality of flange fasteners. In this example and/or other examples, the seat track may further comprise a splice fitting mechanically fastened to a bottom flange of the elongate CFRP base, an adjacent bottom flange of an adjacent elongate CFRP base, and a floor support beam that is mechanically fastened to the elongate CFRP base and the adjacent elongate CFRP base. In this example and/or other examples, the aligned holes defined by the elongate titanium crown, the elongate CFRP flange, and the elongate CFRP base may form a first set of aligned holes, the elongate titanium crown, the elongate CFRP flange, and the elongate CFRP base may form a plurality of sets of aligned holes including the first set, the plurality of sets of aligned holes may be longitudinally spaced apart along the seat track assembly, a plurality of fasteners may be insertable through the plurality of sets of aligned holes to mechanically fasten the elongate titanium crown, the elongate CFRP flange, and the elongate CFRP base to each other, and the plurality of fasteners may be removeable from the plurality of sets of aligned holes to allow for the elongate titanium crown, the elongate CFRP flange, and the elongate CFRP base to be mechanically separated from each other.

In another example, a seat track assembly, comprises an elongate titanium crown configured to removably secure a plurality of seats to the seat track assembly, an elongate CFRP flange configured to support the elongate titanium crown, an elongate CFRP base having a top configured to support the elongate CFRP flange, two sidewalls extending vertically from opposing sides of the top, and two bottom flanges each extending laterally outward from a corresponding sidewall of the two sidewalls, wherein the elongate CFRP base is configured to span a plurality of floor support beams, and a plurality of shear clips corresponding to the plurality of floor support beams, each of the plurality of shear clips being configured to mechanically fasten the elongate CFRP base to the corresponding floor support beam, such that the two bottom flanges of the elongate CFRP base are positioned above the plurality of floor support beams, wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other. In this example and/or other examples, each of the plurality of shear clips may be configured to fit between the two sidewalls of the elongate CFRP base, and each of the plurality of shear clips may be configured to mechanically fasten to each of the two sidewalls via a plurality of base fasteners. In this example and/or other examples, each of the plurality of shear clips may be configured to mechanically fasten to the corresponding floor support beam via a plurality of beam fasteners, and the plurality of base fasteners may be oriented perpendicular to the plurality of beam fasteners in the seat track assembly.

In yet another example, a seat track assembly, comprises an elongate titanium crown configured to removably secure a plurality of seats to the seat track assembly, an elongate CFRP flange configured to support the elongate titanium crown, an elongate CFRP base having a top configured to support the elongate CFRP flange, two sidewalls extending vertically from opposing sides of the top, and two bottom flanges each extending laterally outward from a corresponding sidewall of the two sidewalls, wherein the elongate CFRP base is configured to fit between a pair of adjacent floor support beams, and a plurality of shear clips, each of the plurality of shear clips being configured to mechanically fasten to a corresponding sidewall of the elongate CFRP base and a corresponding sidewall of an adjacent floor support beam, wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other. In this example and/or other examples, the elongate titanium crown and the elongate CFRP flange may both configured to span across tops of the pair of adjacent floor support beams. In this example and/or other examples, the elongate CFRP flange may be mechanically fastened to the pair of adjacent floor support beams via a plurality of flange fasteners.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:
1. A seat track assembly, comprising:
 an elongate titanium crown configured to removably secure a plurality of seats to the seat track assembly;
 an elongate carbon-fiber reinforced polymer (CFRP) flange configured to support the elongate titanium crown; and
 an elongate CFRP base having a top configured to support the elongate CFRP flange, two sidewalls extending vertically from opposing sides of the top, and two bottom flanges each extending laterally outward from a corresponding sidewall of the two sidewalls, wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other.

2. The seat track assembly of claim 1, wherein the elongate CFRP flange includes projections that extend outward laterally beyond sides of the elongate titanium crown, and wherein the projections are configured to support floor panels that span between corresponding projections of neighboring seat track assemblies.

3. The seat track assembly of claim 1, wherein the bottom flanges of the elongate CFRP base include stiffening return flanges that project upward from outer edges of the bottom flanges.

4. The seat track assembly of claim 1, wherein the seat track assembly further comprises a plurality of shear clips corresponding to a plurality of floor support beams, each of the plurality of shear clips being configured to mechanically fasten the elongate CFRP base to a corresponding floor support beam.

5. The seat track assembly of claim 4, wherein the plurality of shear clips are at least one of titanium or CFRP.

6. The seat track assembly of claim 4, further comprising:
a plurality of floor stanchions configured to mechanically couple the plurality of floor support beams to a fuselage structure.

7. The seat track assembly of claim 4, wherein the elongate CFRP base is configured to span the plurality of floor support beams, and wherein each of the plurality of shear clips is configured to mechanically fasten the elongate CFRP base to the corresponding floor support beam such that the two bottom flanges of the elongate CFRP base are positioned above the plurality of floor support beams.

8. The seat track assembly of claim 7, further comprising a plurality of base fasteners, wherein each of the plurality of shear clips is configured to fit between the two sidewalls of the elongate CFRP base, and wherein each of the plurality of shear clips is configured to mechanically fasten to each of the two sidewalls via the plurality of base fasteners.

9. The seat track assembly of claim 8, further comprising a plurality of beam fasteners, wherein each of the plurality of shear clips is configured to mechanically fasten to the corresponding floor support beam via the plurality of beam fasteners, and wherein the plurality of base fasteners are oriented perpendicular to the plurality of beam fasteners in the seat track assembly.

10. The seat track assembly of claim 4, wherein the elongate CFRP base is configured to fit between a pair of adjacent floor support beams of the plurality of floor support beams, and wherein each of the plurality of shear clips mechanically fastens to a corresponding sidewall of the elongate CFRP base and a corresponding sidewall of an adjacent floor support beam.

11. The seat track assembly of claim 10, wherein the elongate titanium crown and the elongate CFRP flange are both configured to span across tops of the plurality of floor support beams.

12. The seat track assembly of claim 10, wherein the elongate CFRP flange is mechanically fastened to the pair of adjacent floor support beams via a plurality of flange fasteners.

13. The seat track assembly of claim 10, further comprising:
a splice fitting mechanically fastened to a first bottom flange of the two bottom flanges of the elongate CFRP base, an adjacent bottom flange of an adjacent elongate CFRP base, and a floor support beam that is mechanically fastened to the elongate CFRP base and the adjacent elongate CFRP base.

14. The seat track assembly of claim 1, wherein the aligned holes defined by the elongate titanium crown, the elongate CFRP flange, and the elongate CFRP base form a first set of aligned holes, wherein the elongate titanium crown, the elongate CFRP flange, and the elongate CFRP base form a plurality of sets of aligned holes including the first set, wherein the plurality of sets of aligned holes are longitudinally spaced apart along the seat track assembly, wherein a plurality of fasteners are insertable through the plurality of sets of aligned holes to mechanically fasten the elongate titanium crown, the elongate CFRP flange, and the elongate CFRP base to each other, and wherein the plurality of fasteners are removeable from the plurality of sets of aligned holes to allow for the elongate titanium crown, the elongate CFRP flange, and the elongate CFRP base to be mechanically separated from each other.

15. A seat track assembly, comprising:
an elongate titanium crown configured to removably secure a plurality of seats to the seat track assembly;
an elongate CFRP flange configured to support the elongate titanium crown;
an elongate CFRP base having a top configured to support the elongate CFRP flange, two sidewalls extending vertically from opposing sides of the top, and two bottom flanges each extending laterally outward from a corresponding sidewall of the two sidewalls, wherein the elongate CFRP base is configured to span a plurality of floor support beams; and
a plurality of shear clips corresponding to the plurality of floor support beams, each of the plurality of shear clips being configured to mechanically fasten the elongate CFRP base to the corresponding floor support beam, such that the two bottom flanges of the elongate CFRP base are positioned above the plurality of floor support beams,
wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other.

16. The seat track assembly of claim 15, further comprising a plurality of base fasteners, wherein each of the plurality of shear clips is configured to fit between the two sidewalls of the elongate CFRP base, and wherein each of the plurality of shear clips is configured to mechanically fasten to each of the two sidewalls via the plurality of base fasteners.

17. The seat track assembly of claim 16, further comprising a plurality of beam fasteners, wherein each of the plurality of shear clips is configured to mechanically fasten to the corresponding floor support beam via the plurality of beam fasteners, and wherein the plurality of base fasteners are oriented perpendicular to the plurality of beam fasteners in the seat track assembly.

18. A seat track assembly, comprising:

an elongate titanium crown configured to removably secure a plurality of seats to the seat track assembly;

an elongate CFRP flange configured to support the elongate titanium crown; an elongate CFRP base having a top configured to support the elongate CFRP flange, two sidewalls extending vertically from opposing sides of the top, and two bottom flanges each extending laterally outward from a corresponding sidewall of the two sidewalls, wherein the elongate CFRP base is configured to fit between a pair of adjacent floor support beams; and a plurality of shear clips, each of the plurality of shear clips being configured to mechanically fasten to a corresponding sidewall of the elongate CFRP base and a corresponding sidewall of an adjacent floor support beam, wherein a fastener is insertable through aligned holes defined by the elongate titanium crown, the elongate CFRP flange, and the elongate CFRP base to mechanically fasten the elongate titanium crown, the elongate CFRP flange, and the elongate CFRP base to each other, and wherein the fastener is removeable from the aligned holes to allow for the elongate titanium crown, the elongate CFRP flange, and the elongate CFRP base to be mechanically separated from each other.

19. The seat track assembly of claim 18, wherein the elongate titanium crown and the elongate CFRP flange are both configured to span across tops of the pair of adjacent floor support beams.

20. The seat track assembly of claim 19, wherein the elongate CFRP flange is mechanically fastened to the pair of adjacent floor support beams via a plurality of flange fasteners.

* * * * *